March 30, 1965  E. R. VRABLIK  3,175,692
FEEDWELL FOR SEDIMENTATION APPARATUS
Filed Nov. 23, 1960  3 Sheets-Sheet 2

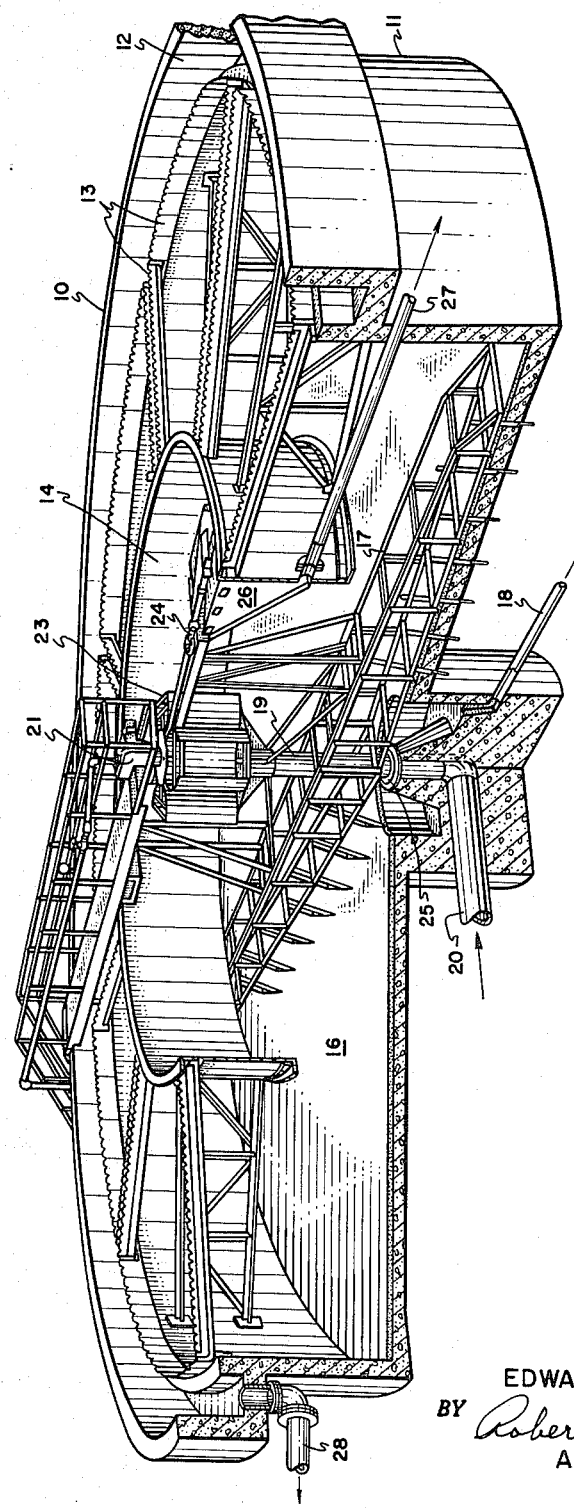

*INVENTOR.*
EDWARD R. VRABLIK
BY *Robert A. Finch*
ATTORNEY

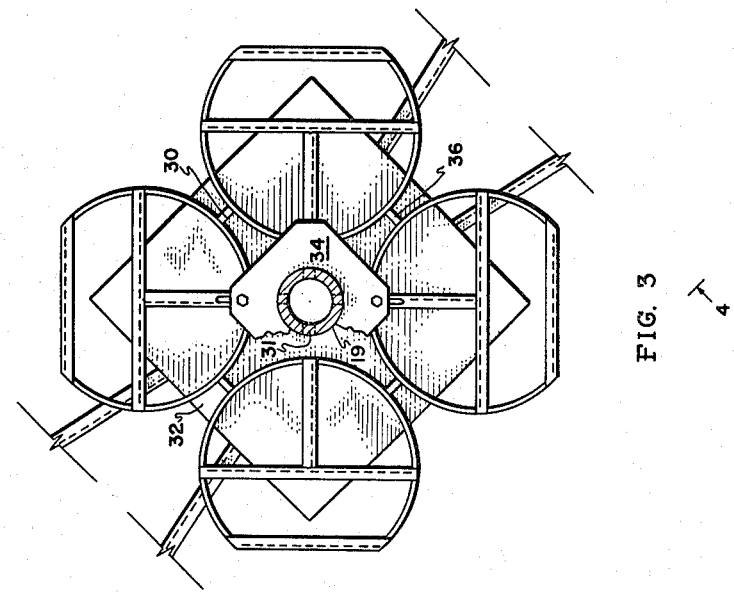
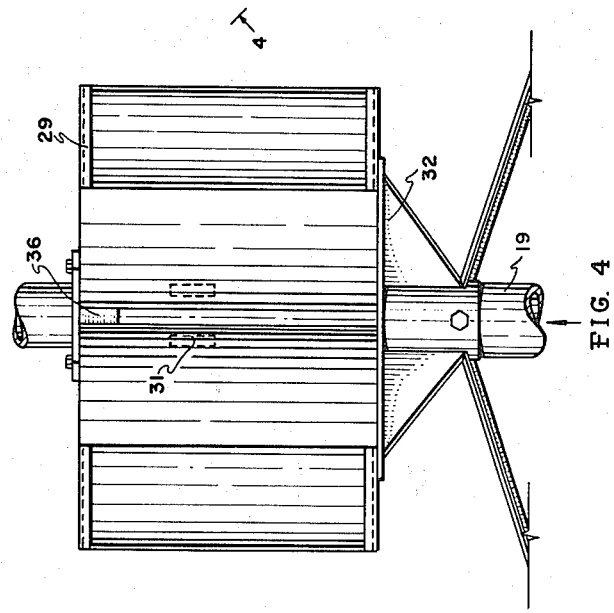

3,175,692
FEEDWELL FOR SEDIMENTATION APPARATUS
Edward R. Vrablik, Niles, Ill., assignor to The Eimco Corporation, Salt Lake City, Utah, a corporation of Delaware
Filed Nov. 23, 1960, Ser. No. 71,264
4 Claims. (Cl. 210—519)

This invention relates to sedimentation apparatus and in particular to means to supply feed thereto for treatment.

As is well known, the primary goal of feedwell mechanisms in sedimentation apparatus is to kill influent energy and provide, as much as possible, diffusion of the liquid feed into the clarification or sedimentation pool proper. To this end, feedwells have taken a variety of forms including those with internal energy killing baffles and plates and radial launders emanating from the tank center and spilling influent over a central portion thereof.

In all such devices, influent is introduced into the clarification pool only at a single elevation. For instance, a usual feedwell heretofore employed eventually introduces feed through the bottom thereof into submergence in the pool. Radial launders introduce feed onto the surface of pool from which it may pass directly into the pool or pass beneath an annular baffle for submerged introduction.

It is the primary object of this invention to provide means for the introduction of influent into a sedimentation pool in a thoroughly diffused state and over a wide vertical extent of submergence in the pool.

A further object is the provision of means by which the diffused influent is caused to follow a changing path and is eventually released into the pool at substantially zero velocity.

A still further object is the provision of a feedwell adapted to eliminate vertical flow components of incoming feed and to confine residual turbulence to horizontal layers thereby enabling sedimentation to occur despite such turbulence.

An important specific object is the provision of means for the separation of an oil-water emulsion in which sedimentation is accomplished throughout substantially the entire volume of the clarification pool whereby dead or ineffective areas are eliminated.

A further and important object is to provide means by which influent may be diffused at a uniform rate throughout the entire depth of the clarification zone of the pool.

As this specification proceeds, the means for attaining the foregoing and other objects will be readily apparent to those skilled in the field to which the invention pertains.

In order that the invention may be more readily understood and carried into effect, reference is made to the accompanying drawings and description thereof which are offered by way of example only and are not to be taken as limiting the invention, the scope of which is defined by the appended claims and the conjoint equivalents thereof falling within the metes and bounds of such claims, rather than by any description preceding them.

In such drawings:

FIG. 1 is a perspective view, partly in section, of sedimentation apparatus embodying the present invention.

FIG. 3 is a top view of the feedwell structure illustrated in FIG. 2, certain parts being partly cut-away and others shown in dotted lines for purposes of clarity.

FIG. 4 is a side elevational view taken as looking in the direction of arrows 4 in FIG. 3, certain elements being shown in dotted lines for clarity.

Figure 5:
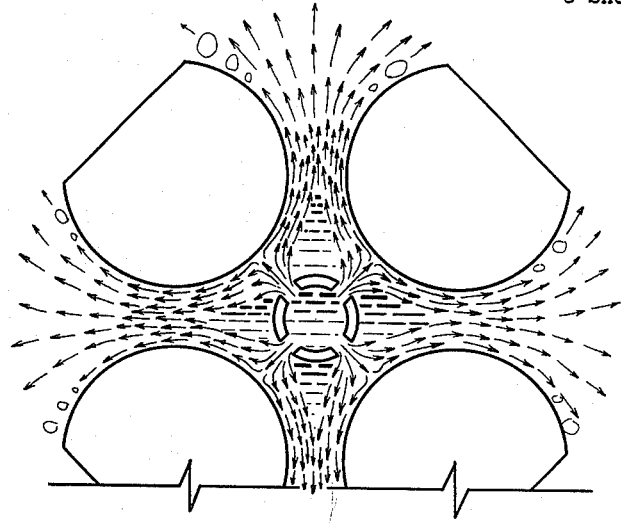
FIG. 5 is a diagrammatic top plan view of a portion of the flow directing baffle means or feedwell of the invention showing fluid flow lines about the illustrated structures.

The embodiment illustrated is specifically designed for the separation of an oil-water emulsion and comprises generally a main outer tank 10 defined by a side wall 11 and having a peripheral launder 12 equipped with usual serrated overflow weirs 13.

In the center of the tank is a central clarification pool generally defined by an annular baffle 14 extending downwardly from above the normal liquid level, as defined by the weirs 13, to terminate at an elevation above the tank bottom 16.

The unit is provided with usual rake arms 17 for raking accumulated solids across the tank bottom to a sludge discharge outlet 18. The rakes are rotatably driven by a central vertical shaft or torque tube 19 driven in usual fashion by a drive mechanism 21 located above the tank.

Incoming feed as supplied through a conduit 20, rises upwardly through the tube 19 into a feedwell or flow directing baffle means generally designated 23. Scum or oil accumulated in the central compartment is removed by means of a suitable rotating skimmer mechanism 24 which plows floating oil into a collection box 26 from which it is discharged through a suitable conduit 27. Heavier liquid, such as water, underflows the baffle 14 and eventually reports to discharge via overflow weirs 13 and launder 12 whence it eventually discharges via a suitable conduit 28.

Figure 2:
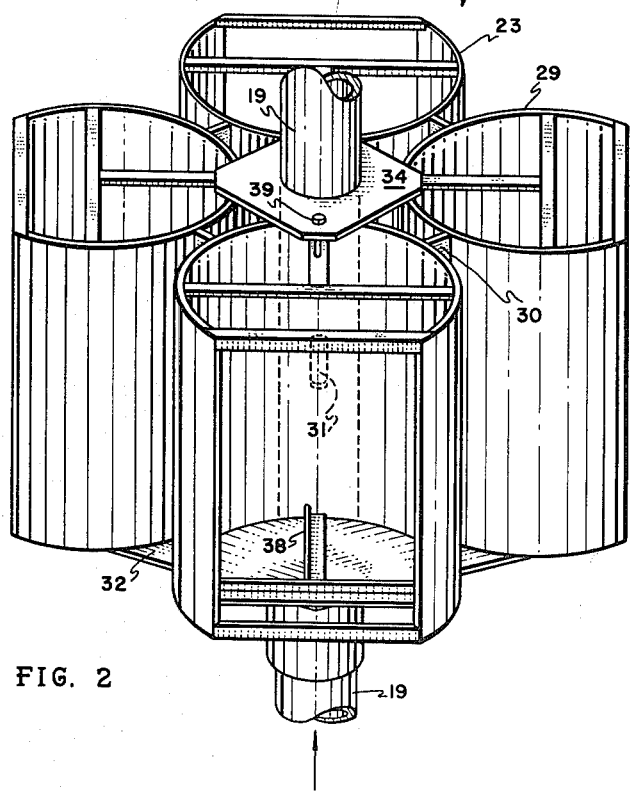
FIG. 2 is an enlarged perspective view of the feedwell structure of the apparatus shown in FIG. 1.

Referring to FIGS. 2–4, it will be noted that the feedwell structure 23 comprises a plurality of spaced apart elongated partially tubular members 29 arranged about the vertical tube 19 to collectively define a feedwell. Each such member has an arcuate or convex wall facing inwardly toward the central inlet and such walls converge toward each other to form outlet passages or slots 30 thence diverge to effect diffusion as hereinafter explained in greater detail. As will become apparent as this specification proceeds, the tubular members may be partial as shown or may be complete tubes or cylinders. Also the members may have a cross section other than circular so long as they accomplish smooth divergence. Hence, as used herein and in the claims the term, tubular, is intended to embrace all such forms.

The central tube 19 is provided with influent openings such as 31 arranged to direct influent streams against the convex walls of the tubular members 29 which serve as target plates for the influent stream.

The tubular members 29 are mounted on an imperforate bottom plate 32 which supports them and at the same time provides a dam against downward flow thus insuring a pressure drop across the elongated outlet passages 30. It is important that such bottom plate extend significantly beyond the outlets in order to minimize downward currents. The effective area of the outlets is determined by spacing between the tubular members. A suitable top plate 34 is also provided simply to tie the elements together and provide top support therefor.

It will be noted that the outlet passages 30 are relatively narrow in order to create a back pressure to insure buildup of a positive head inside the feedwell. This is further insured by the use of plates or partial baffles 36 which extend from the top of the outlet passage 30 above the liquid level to a point below such liquid level. This permits maintainance of a super-elevation of liquid within the feedwell and avoids free spillage of liquid adjacent the upper liquid level.

By careful positioning of the various elements it is insured that there will be a uniform pressure drop across the outlet passages 30 at all elevations thus providing introduction of influent liquid at a uniform rate into the clarification zone over a wide vertical range which preferably encompasses the entire depth of clarification.

It is important that the effective outlet area of the vertical passages be carefully proportioned in order to prevent excessive velocity therethrough and to insure maximum diffusion of streams emanating therefrom. In general, it may be stated that the total area of these passages should be in the range from 1% to 15% of the total area of a cylindrical wall passing through the openings.

As indicated by the arrows in FIG. 5, there is an unusual flow pattern set up. Entering feed strikes the target plates then either eddies within the feedwell or follows along the arcuate wall surfaces into and through the vertical passages 30. Upon emergence from the passages the stream diverges to follow the arcuate surfaces externally of the passages for a considerable distance before breaking away. Theoretically the break away point occurs when the lines of zero velocity break away from the wall, at which point eddy turbulence may be set up in horizontal layers. However, and this is of great importance, vertical flow components are minimized; hence, separation by sedimentation can occur despite eddying.

Behavior of the streams is quite unexpected. For instance, although it would be expected that their behavior would follow that of a venturi, this has not proven to be the case. However, it is known that the maximum included angle at the breakaway point in a venturi is 14°, yet in the structure illustrated this figure has been greatly exceeded and has regularly been as high as 30°. This results in a greater divergence of the stream with proportionately greater diffusion.

It is not known exactly why the stream behaves differently from the usual venturi but it may be theorized that the steps of gradually converging then diverging the liquid along elongated arcuate walls has an effect on the stream eddies of holding them to the wall thereby pulling or stretching the entire stream apart. It follows that as the stream cross section increases, the velocity decreases. Hence the invention reduces the stream velocity almost to zero velocity before breakaway.

Since the pressure drop from inside to outside of the feedwell is substantially equal throughout the entire vertical extent of the passages there is provided excellent diffusion over a wide range of elevations in the clarification zone.

Although the feedwell or flow directing baffle means structure is shown as encompassing only a portion of the depth of the clarification pool, it is within the scope of this invention to use deeper or shallower feedwells and it is also within the scope of the invention to use a greater or smaller number of arcuately shaped elements to form the feedwell wall.

It is an important feature of the invention that the effective outlet passage areas are adjustable. This is not shown in detail in the drawing but may be accomplished by providing positioning notches in the lower bar element 38 into which the inner edges of the elements fit. The elements can then be secured together at the top by any suitable means such as bolt 39.

It is to be noted that when using only four elements, adjustment of all four passages may be obtained simply by moving two opposite elements inwardly or outwardly.

Complete diffusion and uniform distribution is further assured by rotating the feedwell with the rotating tube or shaft 19. This is suitably accomplished by securing the top plate 34 and the bottom plate 32 to the tube for rotation therewith.

In brief summary, the invention contemplates a feedwell comprising a plurality of tubular or arcuate elements mounted in a closed pattern in spaced apart relationship thereby forming a wall which encloses and defines a vessel extending vertically into at least partial submergence in the sedimentation pool, such elements having inwardly facing convex wall portions and being arranged with vertically extending elongated passages therebetween permitting communication from the vessel to the surrounding tank space, and feed inlet ports for directing influent streams against the inwardly facing convex walls; whereby said influent is caused to converge to pass through the passages between the elements thence to diffuse by diverging upon emergence from said passages.

A bottom is provided to confine the body of liquid within the feedwell; and partial dam means are provided adjacent the top of the feedwell in each of the passages to insure a super-elevation of liquid therein to maintain a substantially uniform pressure drop throughout the entire vertical extent of the passages defined between the tubular elements.

The tubular elements can, if desired comprise entire cylinders, but this is not necessary so long as the curvature continues well beyond the outlet passages to a point past the stream breakaway. Certain advantages are to be derived from the use of partial elements as shown as this avoids the danger of the elements collecting material within themselves. The arcuate wall portions may be considered as forming diverging wall members extending from the liquid passages and forming expanding extensions thereof.

Having thus described my invention, what I claim and desire to secure by Letters Patent is:

1. Sedimentation apparatus comprising a tank adapted to contain a substantially constant depth liquid body, feed means for introducing liquid feed to said tank, clarified liquid discharge means remote from said feed means, and dispersion means for dispersing liquid feed received in said tank, said dispersion means comprising flow directing baffle means mounted to extend downwardly into said tank between said feed means and said clarified liquid discharge means, said flow directing baffle means including at least one elongated slot providing a restricted liquid passage therethrough, elongated longitudinally parallel opposed arcuate wall members divergingly extending from along the entire edges of said slot in a direction away from said feed means to form with said slot a gradually converging-diverging liquid passage.

2. Sedimentation apparatus comprising a tank adapted to contain a substantially constant depth liquid body, feed means for introducing liquid feed to said tank, clarified liquid discharge means remote from said feed means, and dispersion means for dispersing liquid feed received in said tank, said dispersion means comprising flow directing baffle means mounted to extend downwardly into said tank between said feed means and said clarified liquid discharge means, said flow directing baffle means being formed by at least a pair of substantially parallel opposed vertically mounted partially cylindrical members mounted in spaced-apart relationship to thereby provide at least one elongated slot therebetween, said flow directing baffle means defining with said slot a gradually converging-diverging liquid passage between said feed means and the clarified liquid discharge means.

3. Sedimentation apparatus comprising a tank adapted to contain a substantially constant depth liquid body, feed means for introducing liquid feed to said tank, clarified liquid discharge means remote from said feed means, and dispersion means for dispersing liquid feed received in said tank, said dispersion means comprising a vertical perforate flow directing baffle means mounted to extend downwardly into said tank between said feed means and said clarified liquid discharge means, said flow directing baffle means being formed by a pair of spaced-apart partial cylindrical members mounted with their longitudinal axes parallel to each other, a plurality of elongated vertical slots in said flow directing baffle means, said slots being formed between the facing convex sides of the spaced-apart partial cylindrical members, whereby to form a gradually expanding liquid passage leading from said slot on both sides of said baffle.

4. Sedimentation apparatus comprising a tank, a solids outlet adjacent to the tank bottom, overflow means adjacent the top of said tank, a continuous downwardly extending skirt concentrically mounted in said tank to extend from above to below said overflow means and terminate above the tank bottom thereby defining a central inner compartment in said tank, a scum outlet in said inner compartment substantially at the level of said overflow means, laterally extending rake means adapted to rotate about the vertical axis of said tank to move solids settled on the tank bottom toward said solids outlet, drive means including a rotatable vertical shaft centered in said tank for rotating said rake means, and feed dispersion means for dispersing liquid feed introduced into said tank for treatment therein; said dispersion means comprising an imperforate flat plate mounted horizontally on said vertical shaft to rotate therewith at an elevation below said overflow means, a perforate vertical baffle extending upwardly from said plate and concentrically surrounding said vertical shaft, said perforate baffle being formed from a plurality of substantially parallel vertically mounted tubular members mounted in spaced-apart relationship whereby there is defined between adjacent ones of said tubular members an elongated vertical slot with gradually diverging passages leading from said slot on both sides of said baffle, and a feed conduit terminating in said feedwell and having outlets for directing streams of liquid toward the inwardly facing convex sides of said tubular members.

References Cited by the Examiner
UNITED STATES PATENTS

| | | | |
|---|---|---|---|
| 2,021,304 | 11/35 | Hardinge | 210—520 |
| 2,678,730 | 5/54 | Coulter | 219—520 X |
| 2,702,124 | 2/55 | Stengel | 210—320 |
| 2,881,923 | 4/59 | Nelson | 210—528 |

FOREIGN PATENTS 920,179  6/55  Germany.

HARRY B. THORNTON, *Primary Examiner.*

HERBERT L. MARTIN, *Examiner.*